United States Patent
Molto et al.

(10) Patent No.: US 6,796,691 B2
(45) Date of Patent: Sep. 28, 2004

(54) INDICATOR LAMP ABLE TO GENERATE AN INCLINED FLUX, FOR A MOTOR VEHICLE

(75) Inventors: Valérie Molto, Bobigny Cedex (FR); Claude Tribouiller, Bobigny Cedex (FR); Jean Rit, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 64 days.

(21) Appl. No.: 09/914,974

(22) PCT Filed: Apr. 1, 2001

(86) PCT No.: PCT/FR01/00026
§ 371 (c)(1),
(2), (4) Date: Sep. 6, 2001

(87) PCT Pub. No.: WO01/49524
PCT Pub. Date: Jul. 12, 2001

(65) Prior Publication Data
US 2002/0159269 A1 Oct. 31, 2002

(30) Foreign Application Priority Data
Jan. 7, 2000 (FR) .............................. 00 00173

(51) Int. Cl.⁷ ................................ B60Q 1/00
(52) U.S. Cl. .................. 362/487; 362/517; 362/518; 362/349; 362/297
(58) Field of Search ................. 362/516, 517, 362/518, 348, 349, 346, 297, 487

(56) References Cited
U.S. PATENT DOCUMENTS
4,740,871 A   4/1988 Dilouya 5,816,680 A * 10/1998 Sato .......................... 362/61

FOREIGN PATENT DOCUMENTS

| | | |
|---|---|---|
| DE | 32 39 754 | 5/1984 |
| FR | 2 590 351 | 5/1987 |
| FR | 2 599 469 | 12/1987 |
| GB | 2 325 516 | 11/1998 |

OTHER PUBLICATIONS

International Search Report dated Apr. 24, 2001.
Patent Abstracts of Japan vol. 1996, No. 05, May 31, 1996 & JP 08 007612 A (Koito Mfg Co Ltd) Jan. 12, 1996.

* cited by examiner

Primary Examiner—Stephen Husar
Assistant Examiner—Anabel Ton
(74) Attorney, Agent, or Firm—Morgan & Finnegan, LLP

(57) ABSTRACT

An indicator lamp for a motor vehicle is delimited at least on one side by a partition (22) running along the lamp over a substantial depth and comprises a light source (10), a flux concentrator and/or recuperator element (211), glazing (30), and an auxiliary reflecting area (212) able to direct, towards the glazing in the vicinity of the partition (22), an auxiliary luminous flux the average direction (x'-x') of which is substantially inclined with respect to the principal axis of emission (x-x).

The auxiliary reflecting area comprises a segment of axisymmetric paraboloid focused in the vicinity of the source, and the axis of which is oriented along the said average direction.

12 Claims, 2 Drawing Sheets

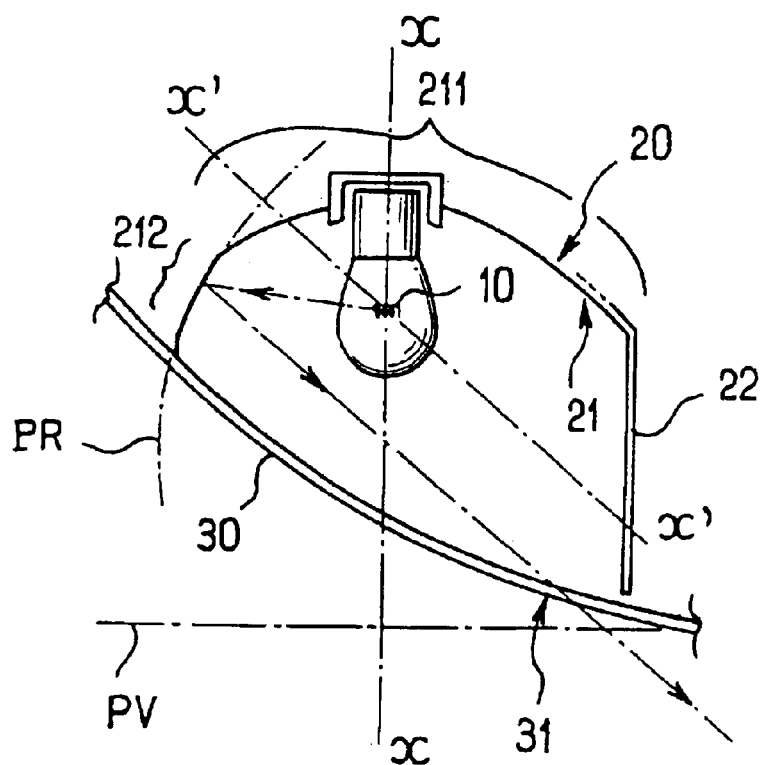
FIG_1
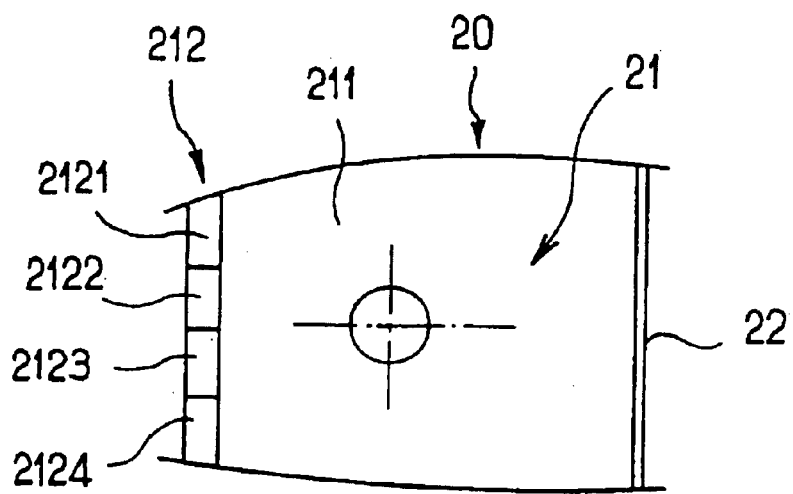
FIG_2

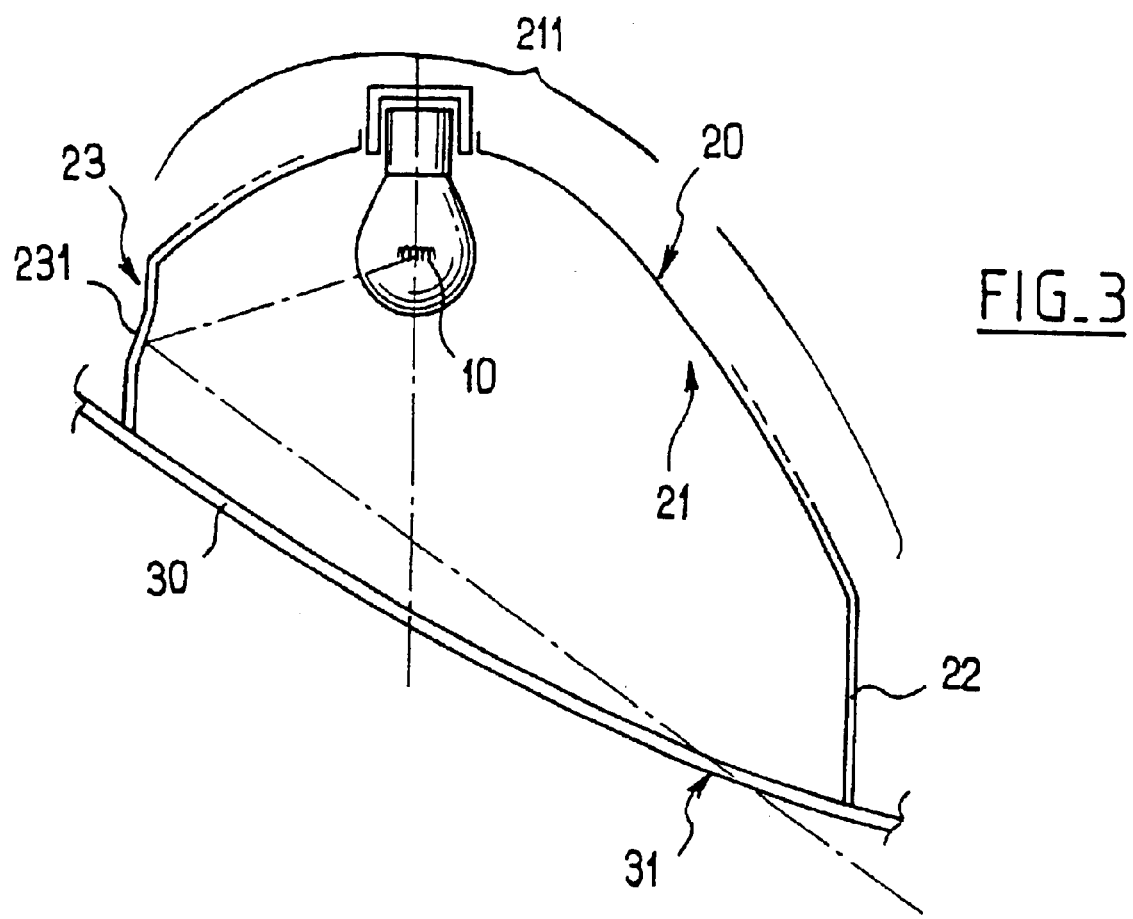
FIG_3

INDICATOR LAMP ABLE TO GENERATE AN INCLINED FLUX, FOR A MOTOR VEHICLE

The present invention relates, in general, to the indicator lamps of motor vehicles.

The general objective of an indicator lamp is to emit light in an indicating region defined by a certain angular interval in terms of height and another angular interval, generally larger, in terms of width, these intervals being defined by a "photometric grid" imposed by the regulations or the constructors, and which moreover defines light minima to be complied with at certain points of the grid.

The distribution of the light originating from the light source and, if appropriate, from an optical element for recovering and/or concentrating the flux (such as an inwardly curved mirror occupying the back of the lamp or a Fresnel lens, for example), is most often undertaken by optical elements, such as spherical or toroidal lenses ("balls") formed into an array on the inner surface of the glazing or bezel of the lamp.

In general, the curvature of this glazing, and principally its average inclination with respect to a vertical plane transverse to the axis of the vehicle, is deliberately limited, precisely so that the glazing can work the light in such a way as to cover the whole of the photometric grid, knowing that this coverage may prove to be very problematical, or even impossible to achieve, if the curvature is substantial.

Furthermore, the present-date tendency as regards the design of indicator lamps translates into lamps of great depth, the glazing of which is sharply curved especially so as to lie within the region of the "wing turn-round" of the vehicle, and for which it is desired that the glazing should be devoid of the balls described above, being either smooth, or provided with optical elements (striations or the like) processing light only in one single dimension (preferably vertically or horizontally).

This tendency renders appropriate coverage of the photometric grid more and more difficult.

The present invention aims to remedy these limitations of the state of the art and to propose an indicator lamp which, while satisfying the modern tendencies, can comply appropriately with the photometric grid imposed, especially as regards width.

Thus the invention proposes an indicator lamp for a motor vehicle, delimited at least on one side corresponding to the inside of the vehicle by a partition running along the lamp over a substantial depth and comprising a light source, a flux concentrator and/or recuperator element comprising a mirror arranged in the back of a lamp cavity delimited partly by the said partition, and glazing, the partition possessing a free edge in the vicinity of the glazing and the flux concentrator and/or recuperator element extending set back with respect to the said free edge of the partition, the lamp possessing a principal emission axis extending substantially parallel to the partition, the said lamp further comprising auxiliary optical means comprising an auxiliary reflecting area situated on the side opposite the said partition with respect to the bulb and able to direct, directly onto the glazing in the vicinity of the partition, an auxiliary luminous flux the average direction of which is substantially inclined laterally with respect to the said principal axis, characterised in that the said auxiliary reflecting area comprises a segment of axisymmetric paraboloid focused in the vicinity of the source and the axis of which is oriented along the said average direction.

Preferred, but non-limiting, aspects of the indicator lamp according to the invention are as follows:

the said auxiliary reflecting area is adjacent to the mirror.

the said auxiliary reflecting area is formed on a step discontinuity in a second partition opposite the said partition and at a distance from the mirror.

the said auxiliary reflecting area comprises at least two sub-areas able to reflect the light into different average directions and/or with different spreading characteristics.

the various sub-areas extend along a row.

the said row extends generally vertically.

the mirror of the lamp is able to spread out the light in horizontal and/or vertical cross-section, and the auxiliary reflecting area is able to spread out the light in the corresponding cross-section(s).

Other aspects, objectives and advantages of the present invention will emerge better on reading the following detailed description of preferred embodiments of it, given by way of non-limiting examples and given by reference to the attached drawings, in which:

FIG. 1 is a diagrammatic view in axial horizontal section of an indicator lamp according to a first embodiment of the invention, FIG. 2 is a front view of the mounting plate of the indicator lamp of FIG. 1, FIG. 3 is a diagrammatic view in axial horizontal section of an indicator lamp according to a second embodiment of the invention.

By reference to the drawings, and first of all to FIGS. 1 and 2, a rear left indicator lamp of a motor vehicle has been represented, which comprises a source consisting, for example, of the incandescent filament 10 of a conventional indicator bulb, this bulb being mounted in a cavity of a mounting plate 20 the back region of which defines a mirror 21 intended to recover the luminous flux emitted by the source rearwards so as to reflect it towards a glazing or bezel 30, of which it can be seen that it exhibits a pronounced curvature with respect to a vertical plane PV transverse to the optical axis x-x of the lamp, itself parallel to the longitudinal axis of the vehicle. The cavity of the mounting plate is delimited laterally, on the inner side of the vehicle, by a partition 22.

The mirror 21 possesses a principal area 211 intended to preform the principal part of the beam. This preformed beam may be, for example:

a generally parallel beam (in the case where the part 211 of the mirror is an axisymmetric paraboloid focused on the source);

a beam which is generally parallel in vertical cross-section and divergent in horizontal cross-section;

a beam which is generally parallel in horizontal cross-section and divergent in vertical cross-section; or even a beam which is divergent both in horizontal cross-section and in vertical cross-section.

These latter three preformed beams are produced, in a way which is itself conventional, by the appropriately designed mirror part 211.

In the first case, the glazing 30 possesses—preferably on its inner face—optical arrangements for spreading the light in the horizontal direction and in the vertical direction, on the basis of the characteristics of the photometric grid to be complied with. In the second and third cases, the glazing is designed to spread the light in a controlled way either essentially vertically, or essentially horizontally. In the fourth case, the glazing spreads the light only slightly or not at all; it can then be essentially smooth, and include decorative features, as appropriate.

Having regard to the overall depth of the lamp and of the curvature of the glazing, such a lamp has difficulty in complying with the photometric grid sought on the inner side of the vehicle (towards the right in FIGS. 1 and 2), given that lateral inclinations of the radiation by 40° or even more with respect to the axis x-x may be desired or even imposed by the regulations. Hence, according to the invention, on the side of the mirror situated on the outside (towards the left in FIGS. 1 and 2), a secondary reflecting area 212 is provided, intended to reflect the radiation originating from the source 10 essentially in a desired direction, inclined with respect to the principal axis x-x.

In one basic embodiment, the area 212 consists of a segment of an axisymmetric paraboloid PR the focus F of which is substantially on the source 10 and the oblique optical axis x'-x' of which defines the average direction sought for the reflected radiation.

In this case, the area 31 of the glazing 30 which is traversed by this auxiliary radiation includes, if necessary, (depending on the photometric grid) optical arrangements capable of spreading the light vertically and/or horizontally, observing that it is these same arrangements which will process the light reflected by the principal area 211 of the mirror in the direction of the said area 31.

In a first variant, provision is made for the auxiliary area 212 of the mirror 21 to consist of several sub-areas, here four sub-areas 2121 to 2124, as illustrated in FIG. 2, the reflecting surfaces of which are intended to reflect the light in different directions (preferably all oblique) and with different divergences, this so as to be able to comply with the corresponding lateral region of the photometric grid without having recourse solely to optical arrangements in the region of the area 31 of the glazing 30.

This can be achieved, for example, by using different segments of axisymmetric paraboloids having different axes and at least some of which can be defocused with respect to the source 10.

According to another variant, the auxiliary area 212 of the mirror can generate an auxiliary beam of oblique average direction, pre-spread in width but substantially parallel in vertical cross-section. In this case, arrangements provided in the area 31 of the glazing produce the desired vertical spreading. This is particularly suitable in the case in which the principal area 211 of the mirror carries out lateral spreading of the principal beam and in which the glazing is tasked with the vertical spreading thereof, for example by the use of horizontal striations.

Conversely, provision can be made for the auxiliary area 212 of the mirror to generate an auxiliary beam spread in vertical cross-section but essentially parallel in the horizontal direction, in which case the glazing 30 then possesses vertical striations in the area 31 in order to carry out the horizontal spreading.

Reflecting surfaces, suitable both for the back 211 of the mirror as well as for its auxiliary area 212, are described, for example, in the document FR 2 664 677 in the name of the Applicant.

A second embodiment of the invention is now described by reference to FIG. 3. In the situation illustrated in this figure, the desired inclination for the auxiliary beam, and the extent of the curvature of the glazing, are such that the solution illustrated in FIGS. 1 and 2 cannot be adopted as it stands: this is because the partition 22 separating the lamp from an adjacent indicating function (or constituting a side wall of the rear lamp cluster) then projects rearwards of the vehicle (downwards in FIG. 3) in such a way that it would obscure a part of the auxiliary radiation emitted with the auxiliary area 212 described by reference to FIGS. 1 and 2.

The solution then consists in forming, in a wall or partition 23 of the mounting plate 20 opposite the partition 22, and at a distance from the principal reflecting surface 211, a step discontinuity on which an auxiliary reflecting area 231 is formed, having an optical behaviour similar to that of the auxiliary reflecting area 212 described above, and capable of being produced according to the same techniques.

Because the area 231 is offset towards the rear of the vehicle (downwards in FIG. 3) with respect to the back of the lamp which the principal area 211 of the mirror occupies, the partition 22 is not likely to obscure the auxiliary beam generated by the said area 231.

Thus, by virtue of the various embodiments of the present invention, situations which are problematic as regards lateral illumination in the regulatory photometric grid can be tackled, without having to modify the general design of the lamp in terms of geometry, of size, of appearance when extinguished (styling, etc.).

Needless to say, the present invention is not in any way limited to the embodiments described above and illustrated in the drawings, but the person skilled in the art will be able to apply numerous variants or modifications to it.

What is claimed is:

1. Indicator lamp defined by a certain angular interval for a motor vehicle, delimited at least on one side corresponding to the inside of the vehicle by a partition running along the lamp over a substantial depth and comprising a light source, a flux concentrator and/or recuperator element comprising a mirror arranged in the back of a lamp cavity delimited partly by the said partition, and glazing, the partition possessing a free edge in the vicinity of the glazing and the flux concentrator and/or recuperator element extending set back with respect to the said free edge of the partition, the lamp possessing a principal emission axis extending substantially parallel to the partition, the said lamp further comprising auxiliary optical means comprising an auxiliary reflecting area situated on the side opposite the said partition with respect to the bulb and able to direct, directly onto the glazing in the vicinity of the partition, an auxiliary luminous flux the average direction which is substantially inclined laterally with respect to the said principal axis of emission wherein the said auxiliary reflecting area comprises a segment of axisymmetric paraboloid focused in the vicinity of the source and the axis of which is oriented along the said average direction, and a plurality of reflective sub-areas with reflective surfaces reflecting light beams that are obliquely oriented with respect to each other.

2. Indicator lamp according to claim 1, wherein the said auxiliary reflecting area is adjacent to the mirror.

3. Indicator lamp according to claim 1, wherein the said auxiliary reflecting area is formed on a step discontinuity in a second partition opposite the said partition and at a distance from the mirror.

4. Indicator lamp according to claim 1, wherein the said auxiliary reflecting area comprises at least two sub-areas able to reflect the light in different average directions and/or with different spreading characteristics.

5. Indicator lamp according to claim 4, wherein the various sub-area extend along a row.

6. Indicator lamp according to claim 5, wherein the said row extends generally vertically.

7. Indicator lamp according to claim 1, wherein the mirror of the lamp is able to spread out the light in horizontal and/or vertical cross-section, and wherein the auxiliary reflecting area is able to spread out the light in the corresponding cross-section(s).

8. Indicator lamp defined by a certain angular interval for a motor vehicle, delimited at least on one side corresponding to the inside of the vehicle by a partition running along the lamp over a substantial depth and comprising a light source, a flux concentrator and/or recuperator element comprising a mirror arranged in the back of a lamp cavity delimited partly by the said partition, and glazing, the partition possessing a free edge in the vicinity of the glazing and the flux concentrator and/or recuperator element extending set back with respect to the said free edge of the partition, the lamp possessing a principal emission axis extending substantially parallel to the partition, the said lamp further comprising auxiliary optical means comprising an auxiliary reflecting area situated on the side opposite the said partition with respect to the bulb and able to direct, directly onto the glazing in the vicinity of the partition, an auxiliary luminous flux the average direction which is substantially inclined laterally with respect to the said principal axis of emission, wherein the said auxiliary reflecting area comprises a segment of axisymmetric paraboloid focused in the vicinity of the source and the axis of which is oriented along the said average direction and at least two sub-areas with reflective surfaces able to reflect the light in different average directions.

9. Indicator lamp defined by a certain angular interval for a motor vehicle, delimited at least on one side corresponding to the inside of the vehicle by a partition running along the lamp over a substantial depth and comprising a light source, a flux concentrator and/or recuperator element comprising a mirror arranged in the back of a lamp cavity delimited partly by the said partition, and glazing, the partition possessing a free edge in the vicinity of the glazing and the flux concentrator and/or recuperator element extending set back with respect to the said free edge of the partition, the lamp possessing a principal emission axis extending substantially parallel to the partition, the said lamp further comprising auxiliary optical means comprising an auxiliary reflecting area situated on the side opposite the said partition with respect to the bulb and able to direct, directly onto the glazing in the vicinity of the partition, an auxiliary luminous flux the average direction which is substantially inclined laterally with respect to the said principal axis of emission, wherein the said auxiliary reflecting area comprises a segment of axisymmetric paraboloid focused in the vicinity of the source and the axis of which is oriented along the said average direction and at least two sub-areas with reflective surfaces able to reflect the light with different spreading characteristics.

10. The indicator lamp according to claim 1, wherein the reflective surfaces are contiguous.

11. The indicator lamp according to claim 8, wherein the reflective surfaces are contiguous.

12. The indicator lamp according to claim 9, wherein the reflective surfaces are contiguous.

* * * * *